(12) United States Patent
Richeimer et al.

(10) Patent No.: US 11,030,495 B2
(45) Date of Patent: Jun. 8, 2021

(54) SYSTEMS AND METHODS FOR INSTANCE SEGMENTATION

(71) Applicant: Octi, Los Angeles, CA (US)

(72) Inventors: Jacob Richeimer, Los Angeles, CA (US); Justin Fuisz, Los Angeles, CA (US); Lukas Schulte, Los Angeles, CA (US)

(73) Assignee: Octi, Los Angeles, CA (US)

( * ) Notice: Subject to any disclaimer, the term of this patent is extended or adjusted under 35 U.S.C. 154(b) by 0 days.

(21) Appl. No.: 16/440,497

(22) Filed: Jun. 13, 2019

(65) Prior Publication Data

US 2019/0385026 A1 Dec. 19, 2019

Related U.S. Application Data

(60) Provisional application No. 62/753,193, filed on Oct. 31, 2018, provisional application No. 62/694,500, filed on Jul. 6, 2018, provisional application No. 62/684,369, filed on Jun. 13, 2018.

(51) Int. Cl.
*G06K 9/74* (2006.01)
*G06T 7/143* (2017.01)
*G06K 9/00* (2006.01)
*G06K 9/62* (2006.01)

(52) U.S. Cl.
CPC ........... *G06K 9/74* (2013.01); *G06K 9/00671* (2013.01); *G06K 9/00718* (2013.01); *G06K 9/6256* (2013.01); *G06T 7/143* (2017.01); *G06T 2207/20076* (2013.01); *G06T 2207/20081* (2013.01); *G06T 2207/20084* (2013.01); *G06T 2207/30196* (2013.01); *G06T 2210/12* (2013.01)

(58) Field of Classification Search
CPC .. G06K 9/74; G06K 9/00671; G06K 9/00718; G06K 9/6256; G06K 9/3233; G06K 9/00362; G06T 7/143; G06T 2207/20076; G06T 2210/12; G06T 2207/20081; G06T 2207/30196; G06T 2207/20084
See application file for complete search history.

(56) References Cited

U.S. PATENT DOCUMENTS

| 6,031,934 A * | 2/2000 | Ahmad | G06K 9/00375 382/154 |
| 2014/0376819 A1* | 12/2014 | Liu | G06K 9/3233 382/205 |
| 2018/0089505 A1* | 3/2018 | El-Khamy | G06T 7/73 |

* cited by examiner

*Primary Examiner* — John W Lee
(74) *Attorney, Agent, or Firm* — Goodwin Procter LLP

(57) ABSTRACT

The invention provides the techniques and systems that allow for the identification and classification of objects (i.e., humans) in images using a predictive segmentation model. More specifically, human forms are identified within an image by generating pixel-level bounding boxes for each possible object and using offsets and segmentation masking. In some instances, embodiments of the invention use an identified floor plane that intersects with a bounding box to identify a three-dimensional position for the intersection point, which can then be assigned to the human form and represent its depth within the image.

18 Claims, 5 Drawing Sheets

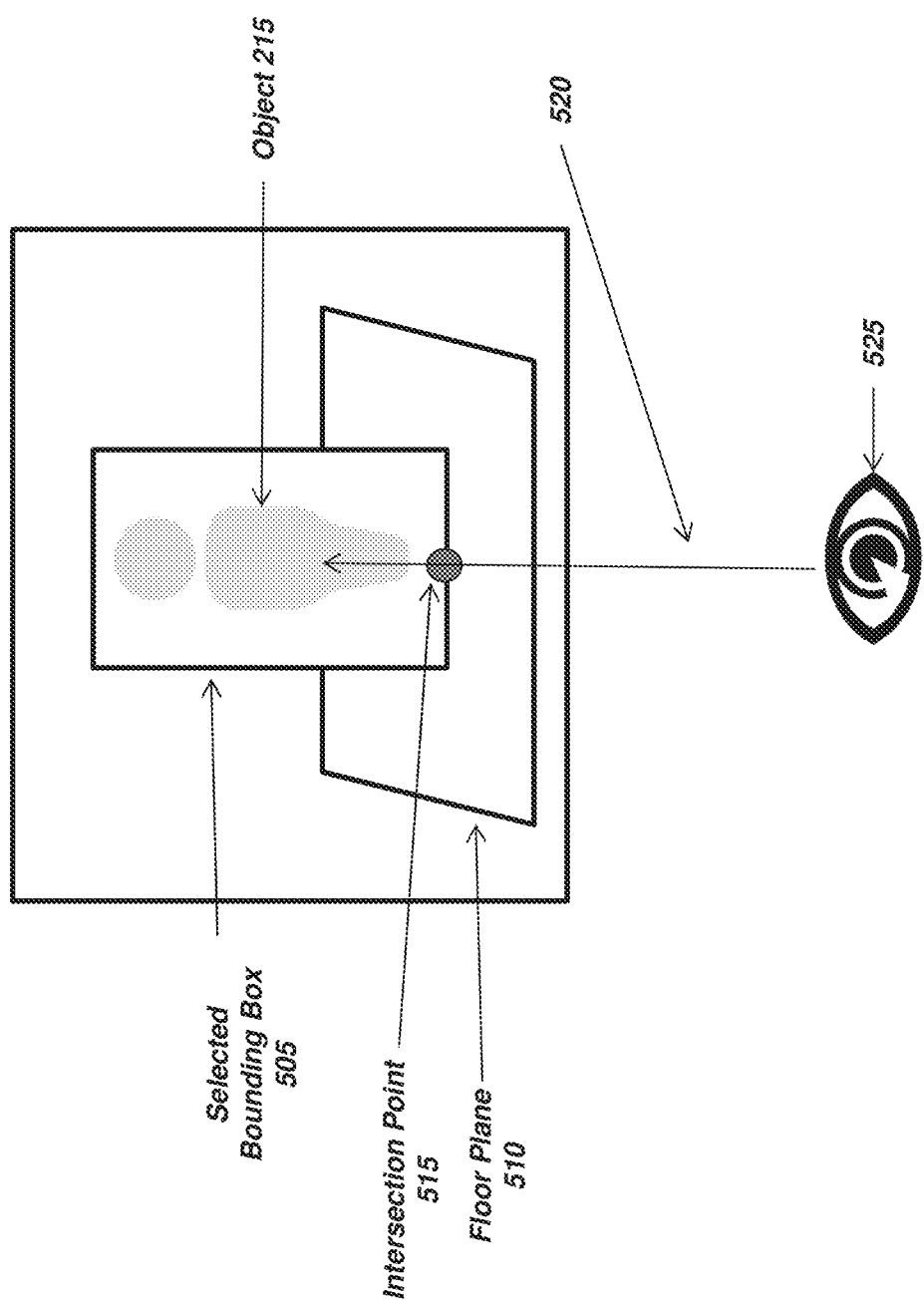

SYSTEMS AND METHODS FOR INSTANCE SEGMENTATION

CROSS REFERENCE TO RELATED APPLICATIONS

This application claims priority to and the benefit of U.S. Provisional Patent Application Ser. Nos. 62/684,369, filed on Jun. 13, 2018, 62/694,500, filed on Jul. 6, 2018, and 62/753,193, filed on Oct. 31, 2018, the entire disclosures of which are incorporated herein by reference.

FIELD OF THE INVENTION

The subject matter of this application relates generally to techniques for identifying and classifying objects within images.

BACKGROUND

Cameras, including video cameras, have become ubiquitous in today's society. With the introduction of cameras into mobile phones, and the explosion of social media applications with which one can share content, consumers have effectively become real-time producers of content for the world to see. Applications such as Snapchat, Instagram, and others use user-generated content such as pictures and video as a basis for messages "stories" that are shared among the application community.

To attract and retain users, these applications must continually add new features and effects. Certain effects, such as combining and manipulating video content, recognizing humans, and manipulating the images, however can introduce computationally intensive processing requirements, and, in many cases, result in poor quality. Moreover, these features face a steep adoption curve if they are not simple to use and work quickly (and with minimal power drain) within the constraints of mobile device computing resources.

SUMMARY OF THE INVENTION

The invention provides the techniques and systems that allow for the identification and classification of objects (i.e., humans) in images using a predictive segmentation model. More specifically, human forms are identified within an image by generating pixel-level bounding boxes for each possible object and using offsets and segmentation masking. In some instances, embodiments of the invention use an identified floor plane that intersects with a bounding box to identify a three-dimensional position for the intersection point, which can then be assigned to the human form and represent its depth within the image.

In one aspect, a method for associating a plurality of pixels with an object within an image includes receiving an image and identifying an anchor bounding box within the image. A pixel is selected from within the image, and an anchor offset is calculated for the pixel. A confidence value is assigned to the pixel, which in some instances represents the likelihood that the pixel is part of an object within the image. If the pixel has a confidence level above a certain threshold, a set of candidate boundary boxes are generated, one of which is then selected as the boundary box for the pixel. This process is then repeated for a plurality of pixels and those pixels having the same candidate bounding box are then grouped such that they collectively represent an object in the image.

In some embodiments, assigning one of the set of candidate bounding boxes to the pixel comprises generating a predicted boundary box by applying a semantic segmentation mask for each pixel within at least a portion of the image by, for example, applying a value to each pixel of the subset of pixels wherein the assigned value represents the likelihood that the pixel is part of an object within the portion of the image. Assigning one of the set of candidate bounding boxes to the selected pixel further may include, in some instances, calculating an overlap value relative to the predicted bounding box for each of the candidate bounding boxes, and assigning a candidate bounding box having the maximum overlap, using, for example, a Jaccard index.

In some embodiments, generating the plurality of candidate bounding boxes is accomplished by applying a trained convolutional network to generate a segmentation mask wherein each pixel (or, in some cases, pixels having a confidence value over a particular threshold) is assigned a confidence value and a set of distance offsets with respect to the anchor box.

In some cases, a depth value to the object in order to estimate its three dimensional placement in the image. This may be done, for example, by (a) identifying a floor plane in the image, (b) identifying an intersection point (e.g., a midpoint of the bottom edge of the assigned candidate bounding box) of the floor plane and the assigned candidate bounding box, (c) projecting a line from a viewpoint through the intersection point and (d) using an endpoint of the projected line as a dimensional coordinate for the object associated with the assigned candidate bounding box. In some cases, the floor plane is represented using a grey-scale image, wherein pure white represents the furthest possible distance from a camera, and pure black represents the closest points to the camera.

In another aspect, the invention provides a computerized system for associating a plurality of pixels with an object within an image. The system includes at least one memory storing computer-executable instructions and at least one processing unit for executing the instructions stored in the memory, wherein execution of the instructions results in one or more application modules for providing an application for execution on a mobile device. The application executes a method for associating a plurality of pixels with an object within an image includes receiving an image and identifying an anchor bounding box within the image. A pixel is selected from within the image, and an anchor offset is calculated for the pixel. A confidence value is assigned to the pixel, which in some instances represents the likelihood that the pixel is part of an object within the image. If the pixel has a confidence level above a certain threshold, a set of candidate boundary boxes are generated, one of which is then selected as the boundary box for the pixel. This process is then repeated for a plurality of pixels and those pixels having the same candidate bounding box are then grouped such that they collectively represent an object in the image.

In some embodiments, assigning one of the set of candidate bounding boxes to the pixel comprises generating a predicted boundary box by applying a semantic segmentation mask for each pixel within at least a portion of the image by, for example, applying a value to each pixel of the subset of pixels wherein the assigned value represents the likelihood that the pixel is part of an object within the portion of the image. Assigning one of the set of candidate bounding boxes to the selected pixel further may include, in some instances, calculating an overlap value relative to the predicted bounding box for each of the candidate bounding boxes, and assigning a candidate bounding box having the maximum overlap, using, for example, a Jaccard index.

In some embodiments, generating the plurality of candidate bounding boxes is accomplished by applying a trained convolutional network to generate a segmentation mask wherein each pixel (or, in some cases, pixels having a confidence value over a particular threshold) is assigned a confidence value and a set of distance offsets with respect to the anchor box.

In some cases, a depth value to the object in order to estimate its three dimensional placement in the image. This may be done, for example, by (a) identifying a floor plane in the image, (b) identifying an intersection point (e.g., a midpoint of the bottom edge of the assigned candidate bounding box) of the floor plane and the assigned candidate bounding box, (c) projecting a line from a viewpoint through the intersection point and (d) using an endpoint of the projected line as a dimensional coordinate for the object associated with the assigned candidate bounding box. In some cases, the floor plane is represented using a grey-scale image, wherein pure white represents the furthest possible distance from a camera, and pure black represents the closest points to the camera.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIG. 5 illustrates the orientation of an object's bounding box with a floor plane within an image to associate a depth value with the object in accordance with various embodiments of the invention.

DETAILED DESCRIPTION

The invention provides the techniques and systems that allow for the identification and classification of objects (e.g., humans) in images using a predictive segmentation model. More specifically, human forms are identified within an image by generating pixel-level bounding boxes for each possible object and using offsets and segmentation masking. In some instances, embodiments of the invention use an identified floor plane that intersects with a bounding box to identify a three-dimensional position for the intersection point, which can then be assigned to the human form and represent its depth within the image.

In various implementations, the disclosed methods and supporting systems use variations of convolutional networks to extract features form an initial image, and subsequently apply a decoder module that upsamples the extracted features back to the same (or substantially the same) resolution as the original input image. An initial bounding box is used as an anchor or "canonical" bounding box and the output produces predicted bounding boxes with pixel-specific offsets from the canonical bounding box. The anchor box is of a fixed width and height and is centered at the pixel for which it is being calculated. In some cases, the anchor box can be a pre-defined, generic box that is sized based on the average object to be detected.

Figure 1:
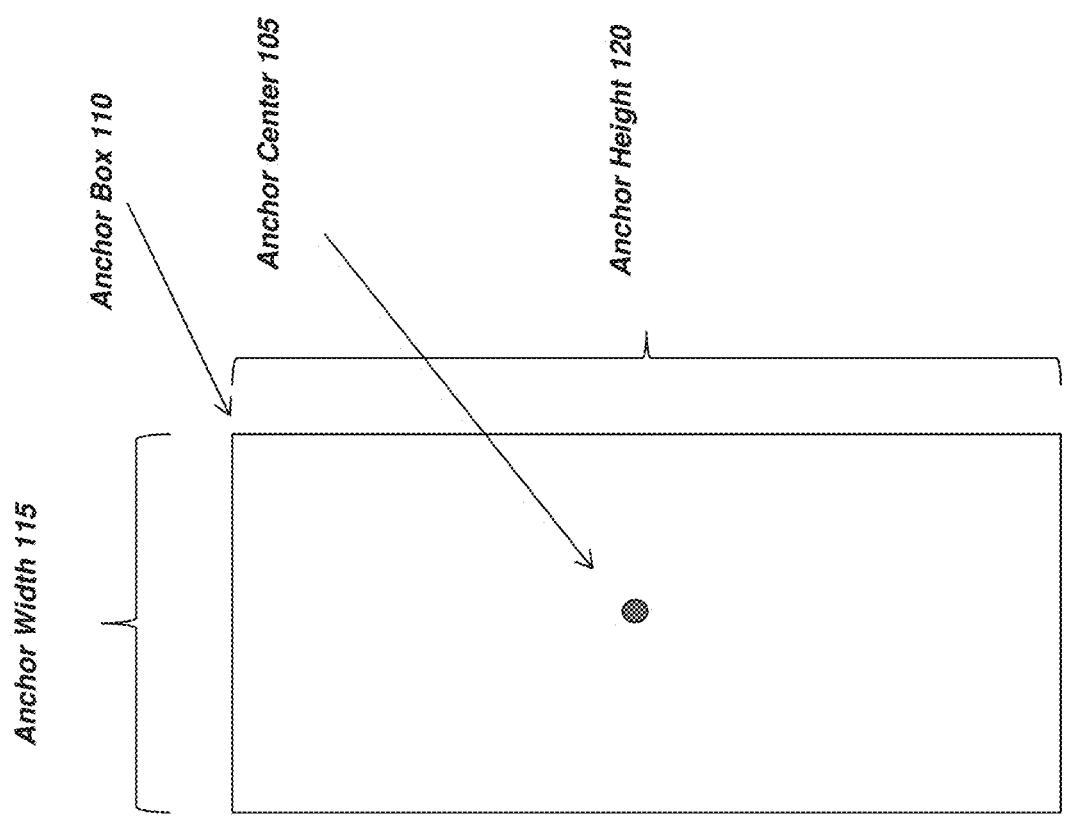
FIG. 1 illustrates an anchor box that may be used as a reference bounding box in various embodiments of the invention.

Referring to FIG. 1, an anchor center 105 is identified. The anchor center may be, for example, a pixel within an image. The pixel may be attributed to a particular object in the image, or may be selected based on its location. In some cases, the pixel may be selected based on its relative stability (e.g., its color values remain consistent from one frame within a video to the next). An anchor box 110 is then identified having the anchor center 105 at its center. The anchor box includes certain size attributes such as an anchor width 115 and an anchor height 120.

Figure 2:
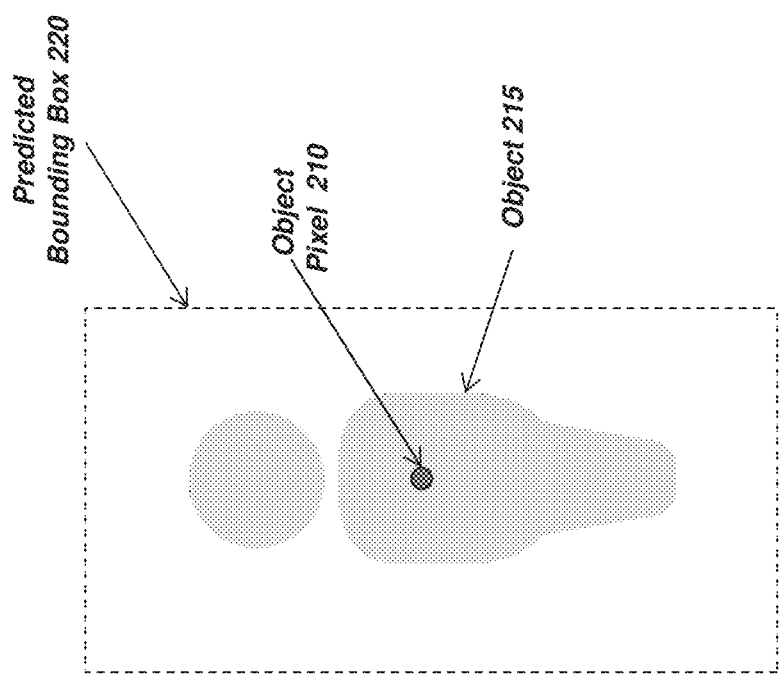
FIG. 2 illustrates an object within an image and the identification of an object-specific pixel and a predicted bounding box for the object in accordance with various embodiments of the invention.

Once an anchor box is created, a convolutional network is applied to predict a semantic segmentation mask for each object of interest within the image, and, for each pixel, predict coordinates for a predicted boundary box belonging to an object of which that pixel is a part. The segmentation mask is configured as an image buffer generated by the network that matches the dimensions of the input image such that the regions of the image buffer can be applied as an overlay. The data in the image buffer can be stored as a single channel image containing 32 bit floats in the range of 0 to 1, where the value represents the confidence that the current position on the image is the object in question (e.g., a person). A "0" value for a pixel indicates that the network thinks that there is no person at that position, whereas a value of "1" indicates a region of the image where the network is identifying as part of the object. Referring to FIG. 2, an image contains a predicted bounding box 220 surrounding a pixel 210 within an object 215 (e.g., a human).

Figure 3:
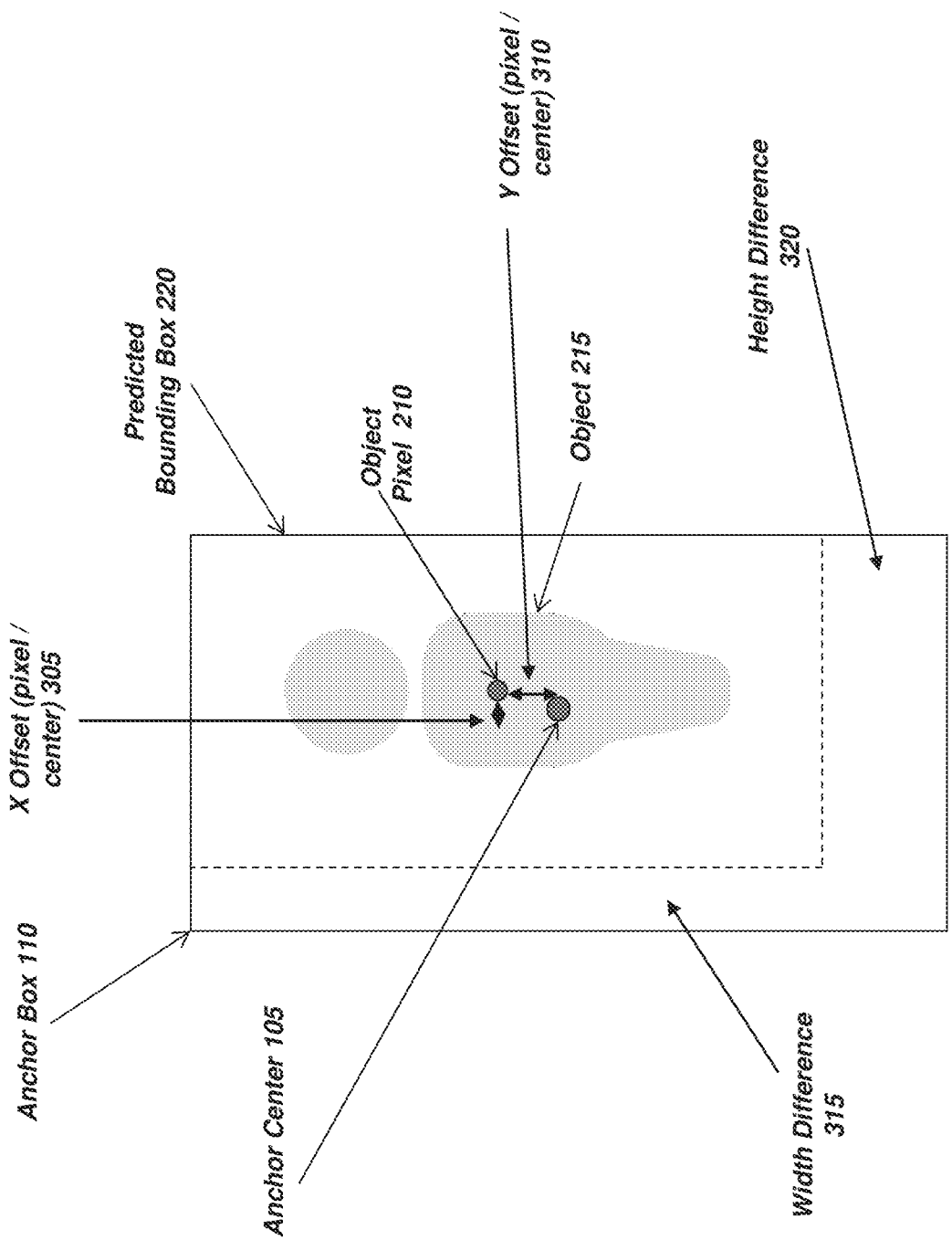
FIG. 3 illustrates the difference in location between the anchor box and a predicted bounding box in accordance with various embodiments of the invention.

Referring to FIG. 3, offsets are calculated to determine how "far" the predicted box 220 differs from the anchor box 110. In some cases, the offset is represented as a four-value offset, specifically, an x and y axis offset (305, 310) from the anchor center 105 and a height and width difference (315, 320) between the anchor box 110 and the predicted box 220.

The process can be repeated such that a dataset is compiled comprising the offset values for each pixel and a using this dataset as a segmentation mask, the convolutional network is trained to optimize the allocation of pixels to a boundary box by minimizing the offsets. The goal of training the network is to slowly modify the parameters in the different layers of the network in order to generate high confidence results with testing data. The network can be initialized with random parameters, then updated using large datasets to refine the parameters using, for example, a gradient descent technique that operates as a minimization function by iteratively moving in the direction of steepest descent as defined by the negative of the gradient.

Figure 4:
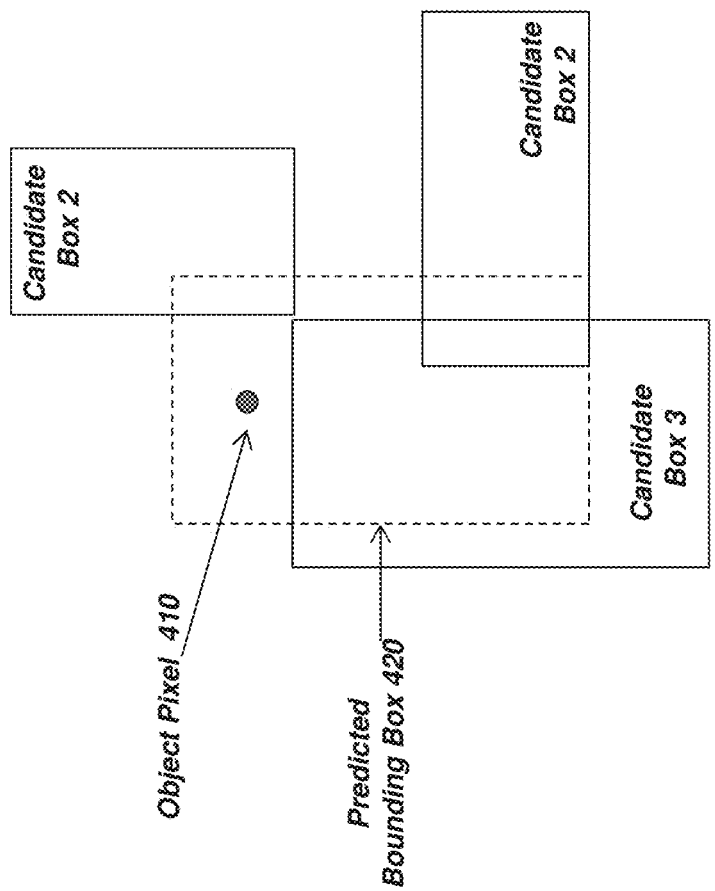
FIG. 4 illustrates the relationship among the predicted bounding box of FIG. 2 with various candidate bounding boxes which may be used to associate the object pixel with a previously identified object in accordance with various embodiments of the invention.

Once the network is trained, it may be used to predict the per-pixel boundary boxes in any image. For example, the network generates a segmentation mask in which each pixel is assigned a value between 0 and 1 and the box offsets with respect to an anchor box as described above. Pixels that have a value above a certain threshold (e.g., >0.95) are identified as peaks in the mask and the predicted boxes belonging to or corresponding to these pixels are collected as candidate boxes. Non-max suppression is then applied to remove redundant/duplicate bounding boxes from the set of candidate boxes to produce the final predicted instance boxes. Each pixel in the segmentation mask that are above a fixed threshold (e.g., 0.5) is processed, and for each pixel its predicted box's overlap with each candidate box is calculated using, for example, a Jaccard index (i.e., an intersection over union) process. Each pixel is then assigned to the candidate box with which it has the highest overlap. FIG. 4 below illustrates an image with three candidate boxes, a current pixel 410, and the predicted box 420 based on the pixel 410. In this example, the pixel 410 is associated with Candidate Box 3, with which its predicted box 420 has the highest overlap.

This process for predicting an association among a set of pixels and subsequently to a specific object as well as an object class (e.g., a person or background) for each pixel may be used to detect all persons in an image, automatically crop one or more of the people out of the image, and/or distinguish among different people within the image even if they overlap. This approach significantly improves upon prior techniques that require two different neural networks to first find instances of people in an image, and then run segmentation individually on each instance.

In some embodiments, the technique further determines the three-dimensional position of the bounding box. Referring to FIG. 5, a floor plane 510 is identified in the image using conventional techniques. The floor plane 510 is then represented using a grey-scale image, where, for example pure white represents the furthest possible distance from the camera, and pure black represents the closest points. To find the three-dimensional position of the figure the intersection point between the depth map and the corresponding bounding box 505 is identified. In one particular approach, this intersection point 515 is the midpoint of the bottom edge of the selected bounding box 505 and the floor plane 510.

Next, an unprojection process translates the two-dimensional intersection point 515 into a three-dimensional world point. For example, the unprojection process draws an imaginary line 520 from the eye 525, through the two-dimensional point 515 on the screen, ending at the depth value, which is then used as the dimensional coordinate for the third dimension. As a result, the bounding box 505, and thus the object 215 (e.g., a human figure) associated with the bounding box, can be identified and assigned to a point in three dimensional space, and tracked from frame to frame.

In one particular embodiment, the above described approach can be used to combine various forms of media into an interactive, immersive communication. More particularly, an original video segment (referred to as a "base video") provides a background scene for the resulting communication. For example, the background could be a video taken by User A at the beach of himself and a few friends. User A then sends the base video to Users B and C via a mobile app, text message, email or other similar means of transmission.

User B opens the message from User A and initiates an application on his device that enables the device camera and records a short (e.g., 2-10 second) video of himself gesturing at the camera. Using the techniques described above, a segmentation neural network process identifies User B's outline in the short video and segments an outline of User B's body. As described above, the segmentation network predicts, for each pixel, the probability that that pixel represents part of a human in the image. The pixels for which the predicted probability is above a fixed threshold are then retained, and the resulting video segmentation of User B is then added to the base video as an overlay, appearing like a sticker or label over the base video. The resulting augmented video can then be shared with User A and User C.

The video data may be transmitted using various methods. For example, User B's combined video can be rendered as a new video file and transmitted to the other users or shared via social media, etc. In another example, the files remain as separate videos (e.g., the base video, the segmentation image, and any location data) and are assembled by the receiving devices using an application. The segmentation process described above can be tuned to identify any particular object, such as pets, cars, etc. In other embodiments, skeleton and face point data can be extracted from the segmentation video and or the base video and transmitted as part of the communication and be manipulated by any of the users involved in the chat.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

What is claimed is:
1. A method for associating a plurality of pixels with an object within an image, the method comprising:
   (i) receiving an image;
   (ii) identifying an anchor bounding box within the image;
   (iii) selecting a pixel from within the image;
   (iv) calculating an anchor offset for the pixel;
   (v) assigning a confidence value to the selected pixel;
   (vi) for pixels having a confidence value above a threshold, generating a plurality of candidate boundary boxes;
   (vii) assigning one of the set of candidate bounding boxes to the pixel;

(viii) repeating steps (iii)-(vii) for a plurality of pixels within the received image;
(ix) grouping pixels having the same assigned candidate bounding box, such that the grouped pixels represent an object in the image; and
(x) assigning a depth value to the object, wherein assigning a depth value comprises: (a) identifying a floor plane in the image, (b) identifying an intersection point of the floor plane and the assigned candidate bounding box, (c) projecting a line from a viewpoint through the intersection point and (d) using an endpoint of the projected line as a dimensional coordinate for the object associated with the assigned candidate bounding box.

2. The method of claim 1 wherein assigning one of the set of candidate bounding boxes to the pixel comprises generating a predicted boundary box by applying a semantic segmentation mask for each pixel within at least a portion of the image.

3. The method of claim 2 wherein the segmentation mask applies a value to each pixel of the subset of pixels wherein the assigned value represents the likelihood that the pixel is part of an object within the portion of the image.

4. The method of claim 2 wherein assigning one of the set of candidate bounding boxes to the selected pixel further comprises calculating an overlap value relative to the predicted bounding box for each of the candidate bounding boxes, and assigning a candidate bounding box having the maximum overlap.

5. The method of claim 4 wherein calculating the maximum overlap comprises using a Jaccard index.

6. The method of claim 1 wherein generating the plurality of candidate bounding boxes comprises applying a trained convolutional network to generate a segmentation mask wherein each pixel is assigned a confidence value and a set of distance offsets with respect to the anchor box.

7. The method of claim 6 further comprising limiting the generation of the plurality of candidate bounding boxes to pixels having a confidence value above a threshold.

8. The method of claim 1 wherein the floor plane is represented using a grey-scale image, wherein pure white represents the furthest possible distance from a camera, and pure black represents the closest points to the camera.

9. The method of claim 8 wherein the intersection point is a midpoint of the bottom edge of the assigned candidate bounding box.

10. A computerized system associating a plurality of pixels with an object within an image, the system comprising:
at least one memory storing computer-executable instructions; and
at least one processing unit for executing the instructions stored in the memory, wherein execution of the instructions results in one or more application modules for providing an application for execution on a mobile device, wherein the application performs the following functions:

(i) receiving an image;
(ii) identifying an anchor bounding box within the image;
(iii) selecting a pixel from within the image;
(iv) calculating an anchor offset for the pixel;
(v) assigning a confidence value to the selected pixel;
(vi) for pixels having a confidence value above a threshold, generating a plurality of candidate boundary boxes;
(vii) assigning one of the set of candidate bounding boxes to the pixel;
(viii) repeating steps (iii)-(vii) for a plurality of pixels within the received image;
(ix) grouping pixels having the same assigned candidate bounding box, such that the grouped pixels represent an object in the image; and
(x) assigning a depth value to the object, wherein assigning a depth value comprises: (a) identifying a floor plane in the image, (b) identifying an intersection point of the floor plane and the assigned candidate bounding box, (c) projecting a line from a viewpoint through the intersection point and (d) using an endpoint of the projected line as a dimensional coordinate for the object associated with the assigned candidate bounding box.

11. The system of claim 10 wherein assigning one of the set of candidate bounding boxes to the pixel comprises generating a predicted boundary box by applying a semantic segmentation mask for each pixel within at least a portion of the image.

12. The system of claim 11 wherein the segmentation mask applies a value to each pixel of the subset of pixels wherein the assigned value represents the likelihood that the pixel is part of an object within the portion of the image.

13. The system of claim 11 wherein assigning one of the set of candidate bounding boxes to the selected pixel further comprises calculating an overlap value relative to the predicted bounding box for each of the candidate bounding boxes, and assigning a candidate bounding box having the maximum overlap.

14. The system of claim 13 wherein calculating the maximum overlap comprises using a Jaccard index.

15. The system of claim 10 wherein generating the plurality of candidate bounding boxes comprises applying a trained convolutional network to generate a segmentation mask wherein each pixel is assigned a confidence value and a set of distance offsets with respect to the anchor box.

16. The system of claim 15 further comprising computer-executable instructions for limiting the generation of the plurality of candidate bounding boxes to pixels having a confidence value above a threshold.

17. The system of claim 10 wherein the floor plane is represented using a grey-scale image, wherein pure white represents the furthest possible distance from a camera, and pure black represents the closest points to the camera.

18. The system of claim 17 wherein the intersection point is a midpoint of the bottom edge of the assigned candidate bounding box.

* * * * *